(12) United States Patent
Kasai

(10) Patent No.: US 6,433,048 B2
(45) Date of Patent: Aug. 13, 2002

(54) ACRYLIC POLYMER FINE PARTICLES AND PLASTISOL USING THE SAME

(75) Inventor: Toshihiro Kasai, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/750,755

(22) Filed: Jan. 2, 2001

Related U.S. Application Data

(63) Continuation-in-part of application No. PCT/JP99/03468, filed on Jun. 29, 1999.

(30) Foreign Application Priority Data

Jul. 1, 1998 (JP) .......................................... 10-199473

(51) Int. Cl.$^7$ .......................... C08L 51/06; C08L 33/08; C08F 265/06
(52) U.S. Cl. ...................... 524/244; 524/297; 524/523; 524/80; 524/309; 523/201
(58) Field of Search .......................... 524/244, 80, 309, 524/523, 297; 523/201

(56) References Cited

U.S. PATENT DOCUMENTS 5,677,053 A * 10/1997 Moriga et al. ............... 428/418
5,928,830 A * 7/1999 Cheng et al. ................ 430/137

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

Acrylic polymer fine particles which comprise primary particles P of 250 nm or more in average particle diameter having a core shell structure and plastisols prepared using the same.

In the fine particles, a core polymer C and a shell polymer S are copolymers of the following monomer mixtures Mc and Ms, respectively, and the weight ratio of Mc and Ms is 10/90–90/10:

Mc:
methyl methacrylate 20–85 mol %
(meth)acrylic ester of $C_2$–$C_8$ aliphatic alcohol and/or aromatic alcohol 15–80 mol %
other copolymerizable monomers not more than 30 mol %;
when the total amount of these monomers is 100 mol %;

Ms:
methyl methacrylate 20–79.5 mol %
(meth)acrylic ester of $C_2$–$C_8$ aliphatic alcohol and/or aromatic alcohol 5–40 mol %
a monomer containing carboxyl group or sulfonic acid group 0.5–10 mol %
other copolymerizable monomers not more than 30 mol %.

25 Claims, No Drawings

ACRYLIC POLYMER FINE PARTICLES AND PLASTISOL USING THE SAME

CROSS-REFERENCE TO RELATED APPLICATION

This application is a continuation-in-part of PCT/JP99/03468 filed on Jun. 29, 1999. Japanese Patent Application No. 10-199473 filed on Jul. 01, 1998, from which this application has the benefit of the priority date, is herein incorporated by reference.

BACKGROUND OF THE INVENTION

The present invention relates to acrylic fine particles having a core-shell structure. Particularly, it relates to a plastisol comprising acrylic polymer fine particles dispersed in a plasticizer. More particularly, it relates to a plastisol which is excellent in storage stability and in retention of plasticizer after film formation by heating.

DESCRIPTION OF THE BACKGROUND

Plastisols comprising polymer fine particles dispersed in plasticizers as media are utilized in a wide variety of industrial fields and have very high industrial values. Especially, plastisols prepared using vinyl chloride polymer fine particles are known as vinyl chloride sols and are used in various fields such as wall papers, undercoats for automobiles, body sealers for automobiles, carpet backing materials, floor covering materials and paints due to their excellent properties.

Owing to the unique properties of vinyl chloride polymer fine particles, vinyl chloride sols are markedly excellent in the following basic properties required for plastisols, that is, (1) the polymer particles are not swollen with or dissolved in plasticizer during storage of the plastisols (hereinafter this property being referred to as "storage stability"); and (2) even after plastisols are applied and allowed to gel by heat treatment to form dry coating films, the plasticizer is satisfactorily retained in the dry coating films and does not bleed out with lapse of time (hereinafter this property being referred to as "plasticizer retainability"), and have come to be industrially widely utilized till today.

However, as for products made using vinyl chloride sols, there has been the problem that when they are incinerated, hydrogen chloride gas is generated to seriously damage incinerators. Moreover, recently, there are problems of acid rain and, furthermore, adverse effects on human bodies and earth environment of the highly toxic dioxin generated upon incineration. Therefore, it has been expected to develop a substitutive material which has similar properties to those of vinyl chloride sols while hardly cause environmental problems.

Under the circumstances, one-pack type urethane materials, epoxy materials, aqueous emulsion materials, silicone materials and the like have been proposed as materials substitutable for vinyl chloride sols. However, for the production of these materials, the existing productive facilities for vinyl chloride sols cannot be utilized, and, thus, an enormous facility investment is required for industrial utilization of these materials. Moreover, one-pack type urethane materials have many problems such as insufficient storage stability due to increase of viscosity, toxicity and high cost. The epoxy materials also have problems of high cost and considerably inferior properties to vinyl chloride sols. Problems of the aqueous emulsions are that they cannot be used for thick coating, blisters that occur in the coating films with evaporation of water, and poor water resistance of the coating films. The silicone materials are also high in cost and cannot be a substitute material for vinyl chloride sols from the points of their properties. Therefore, it is considerably difficult to substitute these materials for vinyl chloride sols.

Recently, plastisols comprising acrylic polymer fine particles, namely, acrylic sols, have been proposed as substitutive materials to solve these problems.

For example, JP-A-60-258241, JP-A-61-185518 and JP-A-61-207418 propose novel plastisols obtained by using composites of a vinyl chloride polymer and an acrylic polymer. However, these plastisols containing essentially a vinyl chloride polymer still produce toxic gases upon incineration like the conventional vinyl chloride sols. Therefore, the above-mentioned environmental problems have not yet been solved.

As plastisols containing no vinyl chloride polymers and other halogen-containing polymers, JP-A-5-255563 proposes a plastisol comprising an acrylic polymer. The polymer used in this patent publication comprises particles of uniform structure, and in the case of the acrylic polymer, storage stability of plastisol and plasticizer retainability of the coating film cannot be realized with particles of uniform structure, and, hence, the storage stability of or properties of the coating film formed from the plastisol proposed in the above patent publication tend to be extremely deteriorated.

This is because unlike vinyl chloride polymers, acrylic polymers only have weak van der Waals cohesive force between molecules, and, hence, when a composition high in compatibility with plasticizer is used, the plasticizer readily penetrates between the molecules to cause plasticization, namely, gelation, which lead to deteriorated storage stability.

Therefore, in order to improve storage stability, it is necessary to lower the compatibility with plasticizer. However, a polymer low in compatibility with plasticizer has good storage stability, nevertheless, the coating film obtained by application and heating of the sol (hereinafter referred to as "gelling film") has considerably low retainability of plasticizer resulting in bleed out of plasticizer from the gelling film with lapse of time.

As explained above, in the case of an acrylic sol prepared using acrylic polymer fine particles, the storage stability and the plasticizer retainability are contrary to each other and polymer particles of uniform structure cannot retain both of them.

JP-A-5-279539 proposes an acrylic plastisol obtained using particles of core-shell structure. In this patent publication, a polymer containing an acid or an acid anhydride is used as the acrylic polymer. However, since the polymer proposed in the patent publication is low in compatibility with plasticizer, and, especially, copolymerization ratio of methyl methacrylate in the shell portion is high, its plasticizing state becomes inferior and it fails to form good coating films when a plasticizer with low polarity such as a phthalic ester plasticizer is used.

In addition, JP-A-6-322225 proposes similarly a plastisol using particles of core-shell structure. According to this technique, the particles of core-shell structure are obtained by preparing particles of uniform structure and thereafter subjecting them to an alkali hydrolysis treatment, thereby converting the ester group in the uppermost surface layer portion of the particles to a carboxyl group. Therefore, the shell portion thereof is very thin and substantially accounts for only about 1% or less of the volume of the particles. Accordingly, the effect of improving storage stability, which is expected as a role of the shell portion, is very low. Furthermore, the shell portion introduced by the alkali hydrolysis has much increased acid value and very low compatibility with the plasticizer to cause considerable deterioration of film-formability. Moreover, since such shell portion with high acid value contributes for polymer particles in the plastisol to form structural viscosity, there is the problem of deterioration in operability due to an increased viscosity of the plastisol.

Furthermore, JP-A-53-144950 proposes another example of plastisol using particles of core-shell structure. It employs a method of obtaining core-shell structure by the stepwise polymerization of monomers having different compositions. In this patent publication, a shell incompatible with plasticizer is used for developing storage stability of the plastisol and there is used a shell formed by copolymerization of at least 80% by weight of methyl methacrylate having low compatibility with many plasticizers. The shell having very low compatibility is advantageous for storage stability, nevertheless, has the tendency of becoming inferior in various performances such as film-formability of sol, and strength, elongation, transparency, adhesion to substrate, sound insulation and vibration-damping properties of the resulting coating film. Especially, since the plastisol is inferior in retention of plasticizers, it tend to cause bleed out of the plasticizers and thus not practical.

Further examples of plastisols prepared using particles of core-shell structure are disclosed in JP-A-7-233299 and JP-A-8-295850. In these examples, fundamental performances are achieved by using core-shell polymers comprising a core portion showing basic compatibility with plasticizers and a shell portion showing basic incompatibility with plasticizers. However, since extremely excellent properties of a polymer are demanded for putting it to practical use, the polymers proposed in the above patent publications, in this respect, are not optimized in balancing of compatibility with plasticizers and are at low levels in both the storage stability and the plasticizer retainability and, therefore, unsuitable for industrial practical use.

As mentioned above, though various researches have been made on acrylic sols to make compatible the storage stability and the plasticizer retainability which are the most basic properties of plastisols, they are all at too low levels as substitutes for vinyl chloride sols to reach industrially practical levels.

SUMMARY OF THE INVENTION

The object of the present invention is to provide at an industrially practical level a novel plastisol which contains no vinyl chloride polymer and is satisfactory in storage stability and retainability of plasticizers.

As a result of intensive research conducted by the inventors in an attempt to solve the above problems, it has been found that an acrylic sol excellent in both the storage stability and the retainability of plasticizer can be obtained by increasing the particle diameter of the acrylic polymer fine particles, and that the balance between the storage stability and the retainability of plasticizer can be improved to an industrially practical level by using an acrylic polymer having a core-shell structure with a primary particle diameter of not less than 250 nm, specifying the monomer composition of the shell portion and controlling the compatibility between the polymer and the plasticizer. Thus, the present invention has been accomplished.

That is, the main points of the present invention are as follows.

1̂ Acrylic polymer fine particles which comprise primary particles P having a core-shell structure comprising a core polymer C and a shell polymer S, wherein the average particle diameter of the primary particles P is not less than 250 nm, the core polymer C and the shell polymer S are copolymers of the following monomer mixtures Mc and Ms, respectively, and the weight ratio of Mc and Ms is 10/90–90/10:

Mc:
methyl methacrylate 20–85 mol %
(meth)acrylic ester of $C_2$–$C_8$ aliphatic alcohol and/or aromatic alcohol 15–80 mol %
other copolymerizable monomers not more than 30 mol %,
when the total amount of these monomers is 100 mol %;

Ms:
methyl methacrylate 20–79.5 mol %,
(meth)acrylic ester of $C_2$–$C_8$ aliphatic alcohol and/or aromatic alcohol 5–40 mol %
monomer containing carboxyl group or sulfonic acid group 0.5–10 mol %
other copolymerizable monomers, not more than 30 mol %,
when the total amount of these monomers is 100 mol %.

2̂ A method for producing the acrylic polymer fine particles described in any one of claims 1–3, comprising the steps:
(1) (a) polymerizing, in a medium mainly composed of water, a monomer which has a solubility of not less than 0.02 mass % in said medium at 20° C. and the polymer of which is insoluble in said medium, using a water-soluble radical polymerization initiator in the absence of emulsifier micelle in said medium, thereby obtaining a polymer dispersion
(b) adding dropwise a monomer mixture into the said polymer dispersion to obtain a coated polymer dispersion, and
(2) spray drying the polymer dispersion to recover polymer fine particles.

DETAILED DESCRIPTION OF THE PREFERRED EMBODIMENTS

In this specification, the term "(meth)acrylic acid" means acrylic acid and/or methacrylic acid, and the term "(meth) acrylate" means acrylate and/or methacrylate.

In this specification, the term "primary particles" means particles of minimum unit which constitute the polymer fine particles.

The acrylic polymer fine particles of the present invention comprise primary particles P having a core-shell structure. The reason for using core-shell structure is that in the case of acrylic polymers, storage stability and plasticizer retainability cannot be compatible with each other if the polymers have a uniform structure. In more detail, the reason is that, unlike vinyl chloride polymers, acrylic polymers only have weak van der Waals cohesive force between molecules, and, hence, when a composition with high compatibility with plasticizer is used, the plasticizer readily penetrates between the molecules to cause plasticization, namely, gelation, which leads to the deterioration of storage stability. Therefore, in order to improve storage stability, it is necessary to lower the compatibility with the plasticizer. However, polymers low in compatibility with plasticizers have good storage stability, nevertheless, gelling products after heating have considerably low plasticizer retainability and the plasticizer bleeds out of the films with lapse of time. That is, in the case of acrylic polymers, the storage stability and the plasticizer retainability are contrary to each other and polymers of uniform structure cannot satisfy them.

On the other hand, in polymers having a core-shell structure, when the core polymer C has a composition with high compatibility with plasticizer and the shell polymer S has a composition with low compatibility with plasticizer, the above conflicting problem can be solved to a cetain extent. That is, during storage, the shell polymer which completely surrounds the polymer inhibits swelling and dissolution with plasticizer, thereby improving storage stability, and, on the other hand, after heating, the core-shell structure is broken due to the active molecular motion and, hence, the plasticizer retainability is improved due to the high compatibility of the core.

The core-shell structure in the present invention means a structure obtained by carrying out seed polymerization of monomer mixtures with different compositions through several stages. The term "seed polymerization" means a polymerization method of absorbing a monomer to a previously prepared polymer particle as a seed and polymerizing the absorbed monomer to grow the particle. Therefore, this must be technically clearly distinguished from polymer particle that is obtained by previously preparing particle with uniform structure by emulsion polymerization or fine suspension polymerization and subjecting it to surface modification by an after-treatment such as alkali hydrolysis.

The first reason therefor is that according to the method of surface modification by an after-treatment such as alkali hydrolysis, only a thin modified layer is introduced into only the uppermost surface layer portion of the particle and such layer is essentially different in physical thickness from the shell having a sufficient thickness intended in the present invention.

Specifically, in the present invention, thickness of the shell portion is not limited, but is preferably not less than about 10% of the diameter of the primary particle.

For example, when the particle diameter is 600 nm and the core/shell weight ratio is 50/50, the physical thickness of the shell is theoretically about 62 nm, and this value is equivalent to a thickness of up to more than 120 molecules, assuming that the size of polymethyl methacrylate molecules is 0.5 nm. When a plastisol is formed, such a thick shell inhibits penetration of plasticizer into the polymer fine particles to contribute to the development of satisfactory storage stability.

On the other hand, in case where particles of uniform structure are subjected to an alkali hydrolysis treatment to introduce a surface modified layer, the thickness is about 10 nm or at most about 20 nm when the particle diameter is 600 nm. This is equivalent to a thickness of merely about several ten molecules in terms of the size of methyl methacrylate molecule, and it is actually impossible to impart storage stability to plastisol by such a thin surface modified layer. In addition, even if the further alkali hydrolysis is attempted, since the surface modified layer produced by the hydrolysis is considerably high in acid value and water soluble, the polymer fine particles are not remained as particles, but are dissolved into aqueous phase and, consequently, a surface modified layer thick enough to be recognized as "shell" cannot be introduced.

The second reason is that the surface modified layer introduced by the alkali hydrolysis or the like is very difficult to control freely its composition, especially, acid value, and is unsuitable for the applications wherein the compatibility with plasticizer is considered important.

In the present invention, especially preferably, when the surface modified layer is introduced by seed polymerization, since the composition of the shell can be optionally controlled, it is possible to optimize the compatibility with plasticizer or glass transition temperature which are important in plastisols. On the other hand, when the surface modified layer is introduced by subjecting particles of uniform structure to an after-treatment such as an alkali hydrolysis, in the composition, only the surface layer portion of the polymer particles becomes high in acid value and the composition cannot be controlled with a certain thickness.

It is necessary that the average particle diameter of the primary particles P having the core-shell structure is not less than 250 nm.

As aforementioned, the balance between storage stability of the plastisol and plasticizer retainability of the coating film can be adjusted to some extent by utilizing the core-shell structure, nevertheless, in order to further improve the balance to industrially practical level, it is necessary to reduce the total surface area of the primary particles and to provide the shell with a thickness of more than a certain value. That is, it is necessary to increase the particle diameter of primary particles having the core-shell structure, and the range of the diameter is not less than 250 nm in average particle diameter. If the average particle diameter is smaller than this range, though the balance between the storage stability and the plasticizer retainability is superior to that of the polymers of uniform structure, the severe criterion of storage stability industrially required, for example, 35° C.×2 weeks, cannot be satisfied, and operability is deteriorated due to increase of viscosity.

The monomer mixture Mc which provides the core polymer C must comprise 20–85 mol % of methyl methacrylate, 15–80 mol % of a (meth)acrylic ester of $C_2$–$C_8$ aliphatic alcohol and/or aromatic alcohol and not more than 30 mol % of other copolymerizable monomers, when the total amount of the monomers is 100 mol %.

If the amount of methyl methacrylate is less than 20 mol % or the amount of the (meth)acrylic ester of $C_2$–$C_8$ aliphatic alcohol and/or aromatic alcohol is more than 80 mol %, Tg of the core polymer (C) per se will be lowered and compatibility of the core polymer (C) with plasticizer will become too high, and, as a result, the gelling product obtained by heating has a very low Tg to cause problems such as tackiness. Furthermore, in this case, even if the core-shell ratio or the primary particle diameter is changed, storage stability of the plastisol is deteriorated and the plastisol is unsuitable for practical use.

If the amount of methyl methacrylate is more than 85 mol % or the amount of the (meth)acrylic ester of $C_2$–$C_8$ aliphatic alcohol and/or aromatic alcohol is less than 15 mol %, compatibility of the core polymer with plasticizer will be lowered and the plasticizer retainability which is the initial intent of the core polymer is deteriorated to cause the problem of bleed out of plasticizer from the gelling product after heating with lapse of time.

In the core polymer, other copolymerizable monomers can be optionally used in an amount of not more than 10 mol %. As such copolymerizable monomers, there may be optionally used monomers having performances required for plastisols, such as adhesion to substrate and reactivity.

Preferred composition of the monomer mixture Mc comprises 20–70 mol % of methyl methacrylate, 30–80 mol % of at least one (meth)acrylic ester selected from the group consisting of n-butyl (meth)acrylate, i-butyl (meth)acrylate and t-butyl (meth)acrylate and not more than 20 mol % of other copolymerizable monomers, when the total amount of the monomers is 100 mol %.

More preferred composition comprises 20–70 mol % of methyl methacrylate, 30–80 mol % of at least one (meth) acrylic ester selected from the group consisting of n-butyl (meth)acrylate, i-butyl (meth)acrylate and t-butyl (meth) acrylate and not more than 10 mol % of other copolymerizable monomers, when the total amount of the monomers is 100 mol %.

In the case of these preferred compositions, the balance between the storage stability and the plasticizer retainability is further improved, and such plastisols as satisfying the very severe requirements of storage stability, such as 40° C.×2 weeks, can be obtained, and, besides, strength and elongation of the coating film obtained from the plastisols are considerably excellent.

In addition, cost can be reduced by utilizing industrially easily available (meth)acrylic esters of $C_4$ alcohol, and thus the plastisols of the present invention are industrially advantageous.

Acrylic polymer fine particles used for acrylic sols have large primary particle diameter, and, hence, contact area with plasticizer is smaller as compared with particles of small particle diameter in the same weight. Accordingly, the storage stability can be maintained even when the amount of MMA in the shell portion is reduced, and a film forming component other than MMA can be supplemented in an amount corresponding to the reduction of MMA, and thus both the plasticizer retainability after the film formation and the storage stability of the acrylic polymer fine particles in sol are improved.

The monomer mixture Ms which provides the shell polymer S must comprise 20–79.5 mol % of methyl methacrylate, 5–40 mol % of a (meth)acrylic ester of $C_2$–$C_8$ aliphatic alcohol and/or aromatic alcohol of, 0.5–10 mol % of a monomer containing carboxyl group or sulfonic acid group and not more than 30 mol % of other copolymerizable monomers, when the total amount of these monomers is 100 mol %.

If the amount of methyl methacrylate is less than 20 mol % or the amount of the (meth)acrylic ester of $C_2$–$C_8$ aliphatic alcohol and/or aromatic alcohol is more than 40 mol %, compatibility of the shell polymer (S) with plasticizer will be so high that the impartation of the storage stability, which is the initial intent of the shell polymer, will be deteriorated to be apt to cause deterioration of basic performances of acrylic sols such as gelation during the preparation of plastisols.

If the amount of methyl methacrylate is more than 79.5 mol % or the amount of the (meth)acrylic ester of $C_2$–$C_8$ aliphatic alcohol and/or aromatic alcohol is less than 5 mol %, compatibility of the shell polymer will be lowered too much, and, hence, regardless of the good storage stability, there will be the tendency to cause the defects that the plasticizer retainability of the coating film after gelation by heating becomes insufficient and the plasticizer bleeds out with lapse of time.

In the present invention, a monomer containing carboxyl group or sulfonic acid group is used for improving storage stability of the plastisol of the present invention and dispersibility of the polymer fine particles in sol.

If the amount of the monomer containing carboxyl group and/or sulfonic acid group is less than 0.5 mol %, compatibility of the shell polymer with plasticizer will increase and, therefore, storage stability will tend to deteriorate.

Furthermore, not desirously, dispersion state of the polymer fine particles in plasticizer will change so as to increase viscosity of the plastisol, tending to deteriorate the operability.

Moreover, if the amount of the monomer containing carboxyl group and/or sulfonic acid group is more than 10 mol %, compatibility of the shell polymer with plasticizer lowers too much and, therefore, when a coating film is formed using such a sol, storage stability of the gelling product is deteriorated and the plasticizer unsuitably bleeds out from the gelling product with lapse of time.

In addition, the gelling product tends to become brittle and strength of the coating film tends to decrease. Further, not desirously, water resistance of the gelling product also tends to decrease.

In the shell polymer, other copolymerizable monomers can be optionally used in an amount of not more than 30 mol %. As these copolymerizable monomers, there may be optionally used those having additional performances required for plastisols, such as adhesion to substrate and reactivity.

Preferred composition of the monomer mixture Ms comprises 30–79.5 mol % of methyl methacrylate, 5–40 mol % of at least one (meth)acrylic ester selected from the group consisting of n-butyl (meth)acrylate, i-butyl (meth)acrylate and t-butyl (meth)acrylate, 0.5–10 mol % of a carboxyl group-containing acrylic monomer and not more than 20 mol % of other copolymerizable monomers, when the total amount of the monomers is 100 mol %.

More preferred composition comprises 55–79.5 mol % of methyl methacrylate, 20–40 mol % of at least one (meth) acrylic ester selected from the group consisting of n-butyl (meth)acrylate, i-butyl (meth)acrylate and t-butyl (meth) acrylate, 0.5–10 mol % of a carboxyl group-containing acrylic monomer and not more than 10 mol % of other copolymerizable monomers, when the total amount of the monomers is 100 mol %.

In the case of these preferred compositions, the balance between the storage stability of the plastisol and the plasticizer retainability of the coating film is further improved, and such plastisols as satisfying the very severe requirements for storage stability, such as 40° C.×2 weeks, can be obtained, and, besides, strength and elongation of the coating film obtained from the plastisols are considerably excellent.

In addition, cost can be reduced by utilizing industrially easily available (meth)acrylic esters of $C_4$ alcohol or carboxyl group-containing acrylic monomers, and thus the plastisols are industrially advantageous.

Weight ratio of the monomer mixture Mc which provides the core polymer C and the monomer mixture Ms which provides the shell polymer S must be 10/90–90/10.

If the proportion of the core polymer is lower than 10% by weight or that of the shell polymer is higher than 90% by weight, since the amount of the core polymer which is a component retaining the plasticizer is too little, there is the problem that plasticizer retainability of a gelling product obtained by heating is insufficient and the plasticizer bleeds out with lapse of time. Otherwise, in the worst case, since compatibility with plasticizer becomes too low, gelation per se becomes impossible even by heating.

If the proportion of the core polymer is higher than 90% by weight or that of the shell polymer is lower than 10% by weight, since the amount of the shell polymer which is a component imparting storage stability is too small, there occurs the serious problem that the polymer is swollen or dissolved with plasticizer even at room temperature, whereby the plastisol increases its viscosity or gels.

Preferred range of the weight ratio of the monomer mixture Mc and the monomer mixture Ms is 30/70–70/30.

Within this range, the balance between the storage stability and the plasticizer retainability is further suitable, and plastisols which can satisfy the severer requirement for storage stability, such as 40° C.×2 weeks, can be obtained.

The (meth)acrylic esters of $C_2$–$C_8$ aliphatic alcohol and/or aromatic alcohol used in the present invention are not particularly limited, and there may be used, for example, (meth)acrylic esters of straight chain aliphatic alcohols, such as ethyl (meth)acrylate, n-butyl (meth)acrylate, i-butyl (meth)acrylate, t-butyl (meth)acrylate, hexyl (meth)acrylate, 2-ethylhexyl (meth)acrylate and octyl (meth)acrylate; (meth)acrylic esters of cyclic aliphatic alcohols, such as cyclohexyl (meth)acrylate; and (meth)acrylic esters of aromatic alcohols, such as phenyl (meth)acrylate and benzyl (meth)acrylate. Preferred are n-butyl (meth)acrylate, i-butyl (meth)acrylate and t-butyl (meth)acrylate. These monomers are easily available and useful from the point of industrial utility.

The carboxyl group- or sulfonic acid group-containing monomers used in the present invention are not particularly limited, and examples thereof include carboxyl group-containing monomers such as methacrylic acid, acrylic acid, itaconic acid, crotonic acid, maleic acid, fumaric acid, methacrylic acid 2-succinoloyloxyethyl-2-methacryloyloxyethylsuccinic acid, methacrylic acid 2-maleinoyloxyethyl-2-methacryloyloxyethylmaleic acid, methacrylic acid 2-phthaloyloxyethyl-2-methacryloyloxyethylphthalic acid and methacrylic acid 2-hexahydrophthaloyloxyethyl-2-methacryloyloxyethylhexahydrophthalic acid, and sulfonic acid group-containing monomers such as allylsulfonic acid. Methacrylic acid and acrylic acid are preferred. These are inexpensive and industrially readily available and are superior in copolymerizability with other acrylic monomers, and, thus, are preferred also from the point of productivity.

Furthermore, these acid group-containing monomers can be in the form of salts with alkali metals and the like. Examples of the salts include potassium salts, sodium salts, calcium salts, zinc salts and aluminum salts. These can be in the form of salts at the time of polymerization in an aqueous medium or can be in the form of salts after polymerization.

Examples of the other copolymerizable monomers used for the core polymers and the shell polymers of the present invention include (meth)acrylates of alcohols of $C_9$ or more carbon atoms, such as lauryl (meth)acrylate and stearyl (meth)acrylate; carbonyl group-containing (meth)acrylates such as acetoacetoxyethyl (meth)acrylate; hydroxyl group-containing (meth)acrylates such as 2-hydroxyethyl (meth)acrylate and 2-hydroxypropyl (meth)acrylate; epoxy group-containing (meth)acrylates such as glycidyl (meth)acrylate; amino group-containing (meth)acrylates such as N-dimethylaminoethyl (meth)acrylate and N-diethylaminoethyl (meth)acrylate; polyfunctional (meth) acrylates such as (poly)ethylene glycol di(meth)acrylate, propylene glycol di(meth)acrylate, 1,6-hexanediol di(meth) acrylate and trimethylolpropane tri(meth)acrylate; acrylamide and derivatives thereof such as diacetonacrylamide, N-methylolacrylamide, N-methoxymethylacrylamide, N-ethoxymethylacrylamide and N-butoxymethylacrylamide; styrene and derivatives thereof; vinyl acetate; urethane-modified acrylates; epoxy-modified acrylates; and silicone-modified acrylates. These can be used depending on the applications.

As the plasticizers, there may be used, for example, those of dialkyl phthalate type such as dibutyl phthalate, dihexyl phthalate, dioctyl phthalate, diisononyl phthalate and diisodecyl phthalate; alkylbenzyl phthalate type such as butylbenzyl phthalate; alkylaryl phthalate type; dibenzyl phthalate type; diaryl phthalate type; triaryl phosphate type such as tricresyl phosphate; trialkyl phosphate type; alkylaryl phosphate type; adipic ester type; ether type; polyester type; and soybean oil type such as epoxidized soybean oil. The respective plasticizers may be combined depending on the properties required for plastisols such as cold resistance, flame retardancy, oil resistance, low viscosity and low thixotropy.

Among them, phthalic ester type plasticizers are preferred because these are industrially inexpensive and easily available and from the points of operability and low toxicity.

These plasticizers can be used either alone or in admixture of two or more depending on the purpose.

Method for production of the acrylic polymer fine particles of the present invention is not particularly limited as far as the above-mentioned compositions and structures can be obtained. For example, a method comprising the preparation of core-shell type particles by seed polymerization and the recovery of solid matter by spray drying method or coagulation method can be employed.

For obtaining core-shell particles of not less than 250 nm, there may be widely utilized a method of growing particles by repeating seed polymerization many times, a method of obtaining the particles by soap-free polymerization, a method of limiting the amount of emulsifier, a method of using an emulsifier with weak emulsifying ability or using a protective colloid, and the like.

Among these methods, industrially simple method is to employ seed polymerization which comprises preparing seed particles having a relatively large particle diameter by soap-free polymerization and sequentially adding dropwise thereto monomer mixtures of optional compositions.

More preferred method comprises polymerizing, in a medium mainly composed of water, a monomer which has a solubility of not less than 0.02 mass % in said medium at 20° C. and is insoluble in said medium, using a water-soluble radical polymerization initiator in the absence of emulsifier micelle in the medium, thereby obtaining a polymer dispersion, and adding dropwise a monomer mixture to the resulting polymer dispersion to obtain a coated polymer dispersion. The reason for the above method being preferred is that soap-free polymerization per se hardly proceeds in the case where the monomer which has a solubility of only not less than 0.02 mass % in the medium is used. Moreover, in case where the polymer obtained from the monomer dissolves into the medium, since no particles are formed, no polymer particles can be obtained. In case where emulsifier micelle is present in the medium, this is naturally out of the definition of the soap-free polymerization and is unsuitable. The above method is advantageous because it is industrially simple, inhibits generation of scales and production of fresh particles, and can stably produce the desired particles.

As far as the acrylic polymer fine particles comprise primary particles P having a core-shell structure, its secondary or higher order structure is not particularly limited. For example, they can have a secondary structure such as particles comprising primary particles cohering with a weak cohesive force, particles cohering with a strong cohesive force or particles fusion bonded to each other with heat, and furthermore these secondary particles can be allowed to have higher order structure by a treatment such as granulation. These higher order structures can be provided, for example, for the purpose of improving operability, such as inhibition of dusting of the fine particles or enhancement of fluidity or for the purpose of improving properties such as improvement of dispersing state of fine particles in plasticizer, and thus the structure can be designed depending on applications and demands.

In the primary particles P having core-shell structure used in the present invention, the core polymer C and the shell polymer S can be graft bonded by a graft crossing agent. As the graft crossing agent in this case, allyl methacrylate and the like can be utilized.

In the primary particles P having core-shell structure used in the present invention, the core polymer C and/or the shell polymer S may be cross-linked. As cross-linkable monomers in this case, the above-mentioned polyfunctional monomers can be utilized. Moreover, ionic cross-linking with carboxyl group or sulfonic acid group can be used by adding a divalent or higher valent alkali metal or a polyfunctional amine besides the polyfunctional monomers.

The plastisols of the present invention can contain various additives depending on applications. For example, there may be freely added fillers such as calcium carbonate, aluminum hydroxide, perlite, clay, colloidal silica, mica powder, siliceous sand, diatomaceous earth, kaolin, talc, bentonite, glass powder and aluminum oxide, pigments such as titanium oxide and carbon black, diluents such as mineral turpentine and mineral spirit, antifoaming agents, antifungal agents, deodorants, antibacterial agents, surface active agents, lubricants, ultraviolet absorbers, perfumes, foaming agents, leveling agents, adhesives and the like.

The plastisols of the present invention can be applied at a thickness of 5 μm–5 mm on a metallic or non-metallic substrate by a known method such as dip coating, spray coating, brush coating or doctor coating and allowed to gel at a temperature of 90–200° C. Furthermore, a molded body can be produced by allowing them to gel in a suitable mold.

The present invention will be explained hereinafter using the examples. Evaluation methods in the examples are as shown below. In the following examples, "part" means "part by weight".

Viscosity of plastisol:
Obtained plastisol was kept at 25° C. in a thermostat water bath, and a viscosity (unit: Pa S) was measured using E-type viscometer after lapse of 1 minute at a number of revolution of 5 rpm and evaluated as follows.
○: Less than 30
Δ: Not less than 30 and less than 50
X: Not less than 50
Storage stability:
The plastisol was kept at 40° C. in a thermostat bath. It was taken out after 1 week, and viscosity thereof was measured again. The viscosity increase ratio (unit: %) of prastisols was calculated in the following manner and evaluated as follows.
(Viscosity after storage/initial viscosity)×100 (%)
⊚:Less than 20
○:Not less than 20 and less than 40
Δ: Not less than 40 and less than 100
X: Not less than 100
Forming a gelling coating film and measurement of strength and elongation thereof:
The plastisol was applied at a thickness of 2 mm on a glass sheet covered with a release paper and was allowed to gel by heating at 140° C. for 20 minutes to obtain a uniform coating film. This was peeled off from the glass sheet and cut to 15 mm wide×80 mm long. Using the portions of 15 mm from both ends of the film as clamping portions, strength and elongation were measured by a tensilon measuring apparatus. The testing speed was 200 mm/min (unit: strength MPa, elongation %). Evaluation was conducted as follows.
Strength:
⊚: Not less than 1.0
○: Not less than 0.8 and less than 1.0
Δ: Not less than 0.4 and less than 0.8
X: Less than 0.4
Elongation:
⊚: Not less than 300
○:Not less than 250 and less than 300
Δ: Not less than 100 and less than 250
X: Less than 100
Plasticizer retainability:
2 Parts of acrylic polymer fine particles and 4 parts of dioctyl phthalate (DOP) were uniformly mixed, and the mixture was poured into an aluminum tray and allowed to gel by heating at 140° C. for 20 minutes. This was once allowed to cool down to room temperature and then stored for 2 weeks in a thermostat bath at 40° C. Whether bleed out of plasticizer occurred or not was judged by visual observation and touch.
○: Bleed out did not occur.
X: Bleed out occurred.

EXAMPLES 1–13

Production of polymer fine particles A1–A12:
1414 Grams of pure water was charged in a 5 liter-four-necked flask equipped with a thermometer, a nitrogen gas introducing pipe, a stirrer, a dropping funnel and a condenser tube, followed by sufficiently passing nitrogen gas therethrough for 30 minutes to replace the dissolved oxygen in the pure water. After the passing of nitrogen gas was stopped, 45.6 g of methyl methacrylate and 34.9 g of n-butyl methacrylate were charged in the flask, followed by heating to 80° C. with stirring at 150 rpm. When the internal temperature reached 80° C., 0.70 g of potassium persulfate dissolved in 28 g of pure water was added at once and soap-free polymerization was started. In this state, the stirring was continued for 60 minutes at 80° C. to obtain a seed particle dispersion.

Successively, a monomer emulsion (prepared by mixing 420.8 g of methyl methacrylate, 348.16 g of n-butyl methacrylate, 7.00 g of sodium dialkylsulfosuccinate (trade name: PELEX O-TP manufactured by Kao Co., Ltd.) and 350.0 g of pure water with stirring to perform emulsification) was added dropwise to the above seed particle dispersion over 2.5 hours, followed by continuing stirring for 1 hour at 80° C. to obtain a polymer dispersion.

Successively, a monomer emulsion (prepared by mixing 533.1 g of methyl methacrylate, 199.1 g of n-butyl methacrylate, 24.08 g of methacrylic acid, 7.00 g of sodium dialkylsulfosuccinate (trade name: PELEX O-TP manufactured by Kao Co., Ltd.) and 350.0 g of pure water with stirring to perform emulsification) was added dropwise to the above polymer dispersion over 2.5 hours, followed by continuing stirring for 1 hour at 80° C. to obtain a polymer dispersion.

The resulting polymer dispersion was cooled to room temperature and, then, spray dried using a spray dryer (Model L-8 manufactured by Ogawara Kakoki Co., Ltd.) with an inlet temperature of 170° C., an outlet temperature of 75° C., and an atomizer revolving number of 25000 rpm to obtain a polymer fine particle A1.

In the same manner as above, acrylic polymer particles A2–A12 having the compositions shown in Table 1 were produced.

Preparation of plastisol:

140 Parts of dioctyl phthalate (DOP) and 100 parts of calcium carbonate were weighed and stirred with 100 parts of each of the resulting acrylic polymer fine particles A1–A12 by a disper mixer (about 2000 rpm×2 minutes), followed by deaeration under reduced pressure to obtain a uniform plastisols.

These acrylic polymer particles A1–A12 were respectively blended according to the formulations shown in Table 2 to obtain plastisols. The resulting plastisols were evaluated and the results are also shown in Table 2.

In Examples 1–13, n-butyl methacrylate or i-butyl methacrylate was used as the methacrylic ester of $C_4$ aliphatic alcohol. In all of these examples, di-2-ethylhexyl phthalate or di-i-nonyl phthalate was used as the dialkyl phthalate ester plasticizer. In all the examples, composition of each monomer was changed with in the most preferred range. In Example 5, 2-hydroxyethyl methacrylate was used as the other monomer in the shell polymer. In Examples 6–8, particles of core-shell structure having a particle diameter of more than 1000 nm were used. In Example 9, styrene was used as the other monomer. In Example 10, ethylene glycol dimethacrylate, a bifunctional monomer, was used as the other monomer. In Example 11, N-butoxymethylacrylamide, a reactive monomer, was used as the other monomer. In Example 12, allyl methacrylate was used as the other monomer. In Example 13, polymer A1 which was the same as in Example 1 was used and a blocked isocyanate was used as the additive.

In all cases, properties were satisfactory, and, especially, storage stability of the plastisols and strength and elongation of the coating films were markedly excellent.

Comparative Examples 1–9

Polymer fine particles A'1–A'9 of the compositions shown in Table 1 were produced in the same manner as in Example 1, and plastisols were prepared according to the formulations shown in Table 2 in the same manner as above. The results of evaluation of these plastisols are shown in Table 2.

In Comparative Example 1, the example (A'1) where proportion of the shell polymer was increased to 95%, since the proportion of the core polymer having good compatibility with the plasticizer was too small, the plasticizer bled out with lapse of time and the plasticizer retainability was inferior. In Comparative Example 2, the example (A'2) where proportion of the core polymer was increased to 95%, immediately after the particles were added to the plasticizer, gelation proceeded and the storage stability was extremely inferior, and evaluation of the gelling film could not be conducted. In Comparative Example 3, the example (A'3) where the amount of nBMA, a methacrylic ester of $C_4$ aliphatic alcohol, in the core polymer was reduced to 10 mol %, since the compatibility of the core polymer with the plasticizer was considerably deteriorated, the plasticizer bled out from the gelling product with lapse of time and the plasticizer retainability was inferior. In Comparative Example 4, the example (A'4) where the amount of nBMA, a methacrylic ester of $C_4$ aliphatic alcohol, in the shell polymer was reduced to 2 mol %, too, the plasticizer bled out and the plasticizer retainability was inferior. In Comparative Example 5, the example (A'5) where the amount of nBMA, a methacrylic ester of $C_4$ aliphatic alcohol, in the core polymer was increased to 85 mol %, since compatibility of the core polymer with the plasticizer much increased and exceeded the suitable range, the storage stability was extremely inferior. In Comparative Example 6, the example (A'6) where the amount of nBMA, a methacrylic ester of $C_4$ aliphatic alcohol, in the shell polymer was increased to 45 mol %, since the shell which was to be intrinsically low in compatibility with the plasticizer became high in compatibility, gelation proceeded immediately after the addition of the plasticizer and the storage stability was extremely inferior, and thus evaluation as a gelling film could not be conducted. In Comparative Example 7, the example (A'7) where the amount of methacrylic acid, a carboxyl group-containing monomer, in the shell polymer was reduced to 0.2 mol %, the dispersion state of the polymer fine particles in the plasticizer changed and the plastisol was high in viscosity and was inferior. In Comparative Example 8, the example (A'8) where the amount of methacrylic acid, a carboxyl group-containing monomer, in the shell polymer was increased to 12 mol %, compatibility with the plasticizer considerably lowered and gelling state was deteriorated to cause decrease of strength. In addition, bleeding occurred and plasticizer retainability was inferior. Comparative Example 9 was the example (A'9) where the particle diameter of the primary particles having core-shell structure was 80 nm (in this case, not flake Marseille, but PELEX SS-H (trade name) manufactured by Kao Co., Ltd. was used as the emulsifying agent). In this case, owing to much increase of total surface area of the primary particles and insufficient thickness of the shell polymer protecting the core polymer from dissolution with the plasticizer, storage stability was deteriorated and the product could not be practically used.

Comparative Examples 10–12

Polymer particles A'10–A'12 having the compositions as shown in Table 1 were produced in accordance with the example shown in JP-A-7-233299, and plastisols were prepared in accordance with the formulations shown in Table 2 in the same manner as in Example 1. The results of evaluation conducted on the plastisols are shown in Table 2.

Comparative Examples 10–12 are the examples where polymers (A'10–A'12) proposed in JP-A-7-233299 were used. Comparative Examples 10 and 11 provided plastisols having satisfactory initial state, but since the proportion of methyl methacrylate was too high, when a dialkyl phthalate ester plasticizer was used, the compatibility between the coating film and the plasticizer was too low, resulting in insufficient elongation and plasticizer retainability. In Comparative Example 12, since the proportion of methyl methacrylate in the core polymer was too high and carboxyl acid group- or sulfonic acid group-containing monomer was not used in the shell polymer, storage stability of the plastisol was low and properties of the coating film could not be evaluated.

Comparative Examples 13–14

Polymer particles A'13–A'14 having the compositions as shown in Table 1 were produced in accordance with the examples shown in JP-A-8-295850, and plastisols were prepared in accordance with the formulations shown in Table 2 in the same manner as in Example 1. The results of evaluation conducted on the plastisols are shown in Table 2.

Comparative Examples 13–14 were examples where polymers proposed in JP-A-8-295850 were used (A'13–A'14). In Comparative Examples 13, since the proportion of methyl methacrylate in the shell polymer was too high, elongation and plasticizer retainability of the coating film were inferior, though the storage stability was good. In Comparative Example 14, since the proportion of methyl methacrylate in the core was too low, storage stability was inferior and properties of the coating film could not be evaluated.

Comparative Examples 15–16

Polymer particles A'15–A'16 having the compositions as shown in Table 1 were produced in accordance with the examples shown in JP-A-5- 279539, and plastisols were prepared in accordance with the formulations shown in Table 2 in the same manner as in Example 1. The results of evaluation conducted on the plastisols are shown in Table 2.

Comparative Examples 15–16 were the examples where polymers proposed in JP-A-5-279539 were used (A'15–A'16). In all of these comparative examples, since the proportion of methyl methacrylate in the shell polymer was too high, plasticization could not be performed with di-2-ethylhexyl phthalate, and dioctyl phthalate was used here. In all of them, the initial viscosity was good, but storage stability was inferior. Moreover, the coating film was somewhat low in strength and was inferior.

Examples 17–20

Polymer particles A'17–A'20 having the compositions as shown in Table 1 were produced in accordance with the examples shown in JP-A-5-255563, and plastisols were prepared in accordance with the formulations shown in Table 2 in the same manner as in Example 1. The results of evaluation conducted on the plastisols are shown in Table 2.

Comparative Examples 17–20 show examples where polymers proposed in JP-A-5-255563 were used (A'17–A'20). The polymers proposed in this patent publication are not particles of core-shell structure, but those of uniform structure, which are different from the particles aimed at by the present invention in particle structure. As the plasticizers at the time of preparation of plastisols, those shown in the patent publication were used. In Comparative Example 17, the storage stability was inferior and the film strength was also somewhat inferior. In Comparative Example 18, the storage stability was inferior. In Comparative Example 19, the compatibility between the polymer and the plasticizer was too high, and the storage stability was inferior and strength of the coating film was also low.

Comparative Examples 21–24

Polymer particles A'21–A'24 having the compositions as shown in Table 1 were produced in accordance with the examples shown in JP-A-6-322225, and plastisols were prepared in accordance with the formulations shown in Table 2 in the same manner as in Example 1. The results of evaluation conducted on the plastisols are shown in Table 2.

Comparative Examples 21–24 were the examples where polymers proposed in JP-A-6-322225 were used (A'21–A'24). This patent publication mentions that particles having core-shell structure are used, but the particles having core-shell structure mentioned therein are obtained by first producing particles having uniform structure comprising an acrylic resin and hydrolyzing the ester linkage on the surface of the particles, thereby introducing carboxyl group into only the surface portion of the particles. When the polymer particles are treated with an alkali under the conditions described in the patent publication, the ester linkages hydrolyzed are those in the range of about several nm from the surface of the particles. Therefore, the proportion of the shell polymer greatly differs from that of the shell polymer in the particles of core-shell structure of the present invention, and it is 30–70 mol % of the polymer particles in the case of the present invention while it is at most 5 mol % or less in the case of the above patent publication. Especially, considering that average particle diameter of the polymer particles used in the patent publication is about 2 microns, surface area of the particles to volume of the particles is very small, and, accordingly, the proportion of the shell polymer is calculated to be actually less than 1 mol %. Therefore, the core-shell ratio is shown as 99/1 in Table 1.

In Comparative Examples 21–22, a composition mainly composed of methyl methacrylate was used, and, hence, for satisfactory plasticization, a plasticizer of high polarity must be used, and, thus, a dialkyl phthalate plasticizer of short alkyl chain was used. Therefore, storage stability of the plastisol was inferior and strength of the coating film was also somewhat low. In Comparative Example 23, storage stability and the coating film strength are somewhat insufficient. In Comparative Example 24, storage stability was somewhat insufficient and strength of the coating film was sharply lowered.

Comparative Examples 25–26

Polymer particles A'25–A'26 having the compositions as shown in Table 1 were produced in accordance with the examples shown in JP-A-53-144950, and plastisols were prepared in accordance with the formulations shown in Table 2 in the same manner as in Example 1. The results of evaluation conducted on the plastisols are shown in Table 2.

Comparative Examples 25–26 were the examples where polymers proposed in JP-A-53-144950 were used (A'25–A'26). In Comparative Example 25, as compatibility of the polymer with the plasticizer was low, though the storage stability was sufficient, the plasticizer retainability was low, bleeding out occurred, and elongation was low. In the case of Comparative Example 26, though compatibility of the core portion was improved, copolymerization ratio of methyl methacrylate in the shell portion was too high, and since the compatibility, as a whole, was too low, plasticizer retainability was low and bleeding out occurred.

As explained in detail herein above, the acrylic polymer fine particles of the present invention can provide plastisols which have excellent storage stability and plasticizer retainability equal to those of vinyl chloride sols prepared using vinyl chloride polymers and, besides, are free from adverse effects on environment which the vinyl chloride sols have. Thus, the plastisols of the present invention have conspicuously great industrial values and conspicuously high effects on the preservation of the earth environment.

Abbreviations in Table 1 mean the following.
MMA: Methyl methacrylate
nBMA: n-Butyl methacrylate
iBMA: i-Butyl methacrylate
MAA: Methacrylic acid
2EHA: 2-Ethylhexyl acrylate
St: Styrene
EDMA: Ethylene glycol dimethacrylate
NBMA: N-butoxymethylacrylamide
AMA: Allyl methacrylate
BzMA: Benzyl methacrylate
CHMA: Cyclohexyl methacrylate
EMA: Ethyl methacrylate
AA: Acrylic acid
nBA: n-Butyl acrylate
   Abbreviations in Table 2 mean the following.
DOP: Di-2-ethylhexyl phthalate
DINP: Diisononyl phthalate
DOPh: Dioctyl phosphate
DBP: Butylbenzyl phthalate
DEP: Diethyl phthalate
$CaCO_3$: Calcium carbonate
   The units in the tables are as follows.
Composition: Part by weight
Viscosity: Pa·S Storage stability: %
Strength: MPa
Elongation: %

INDUSTRIAL APPLICABILITY

The plastisols of the present invention have excellent storage stability and gelling performance, and, furthermore, strength and elongation of the resulting coating films are both excellent. Therefore, they can be widely used for various uses for which vinyl chloride sols have been widely used, for example, packing, gasket, interior parts such as wall paper, toys, daily necessaries, miscellaneous goods, abrasion- and corrosion-resistant paints for steel-made bases, various coating such as chipping resistant coating films for bottoms of, e.g. cars, trucks and buses, and for molding and coating of films, sheets, etc.

TABLE 1

Monomer composition and characteristics of the produced polymer fine particles

| Polymer fine particles | Monomer composition (mol %) Core (Mc) | Shell (Ms) | Core-shell ratio | Particle diameter (nm) | Thickness of shell (nm) |
|---|---|---|---|---|---|
| A1 | MMA/nBMA 60/40 | MMA/nBMA/MAA 76/20/4 | 50/50 | 350 | 36 |
| A2 | MMA/nBMA 50/50 | MMA/nBMA/MAA 76/20/4 | 35/65 | 340 | 35 |
| A3 | MMA/nBMA 65/35 | MMA/nBMA/MAA 76/20/4 | 65/35 | 880 | 59 |
| A4 | MMA/iBMA 50/50 | MMA/iBMA/MAA 71/25/4 | 50/50 | 360 | 37 |
| A5 | MMA/nBMA 65/35 | MMA/iBMA/MAA/2HEMA 67/29/2/2 | 50/50 | 400 | 41 |
| A6 | MMA/nBMA 65/35 | MMA/iBMA/MAA/2HEMA 67/29/2/2 | 50/50 | 1200 | 124 |
| A7 | MMA/nBMA 60/40 | MMA/nBMA/MAA 76/20/4 | 70/30 | 1460 | 82 |
| A8 | MMA/nBMA 40/60 | MMA/nBMA/MAA 76/20/4 | 50/50 | 1410 | 145 |
| A9 | MMA/nBMA/St 60/35/5 | MMA/nBMA/MAA/St 76/15/4/5 | 50/50 | 360 | 37 |
| A10 | MMA/nBMA/EDMA 59.8/40/0.2 | MMA/nBMA/MAA 76/20/4 | 50/50 | 350 | 36 |
| A11 | MMA/nBMA/NBMA 50.8/40/0.2 | MMA/nBMA/MAA/NBMA 75.8/20/4/0.2 | 50/50 | 390 | 40 |
| A12 | MMA/nBMA/AMA 50.8/40/0.2 | MMA/nBMA/MAA 76/20/4 | 50/50 | 360 | 37 |
| A'1 | MMA/nBMA 60/40 | MMA/nBMA/MAA 76/20/4 | 5/95 | 350 | 145 |
| A'2 | MMA/nBMA 60/40 | MMA/nBMA/MAA 76/20/4 | 95/5 | 390 | 3 |
| A'3 | MMA/nBMA 90/10 | MMA/nBMA/MAA 76/20/4 | 50/50 | 340 | 35 |
| A'4 | MMA/nBMA 60/40 | MMA/nBMA/MAA 94/2/4 | 50/50 | 350 | 36 |
| A'5 | MMA/nBMA 15/85 | MMA/nBMA/MAA 76/20/4 | 50/50 | 350 | 36 |
| A'6 | MMA/nBMA 60/40 | MMA/nBMA/MAA 51/45/4 | 50/50 | 350 | 36 |
| A'7 | MMA/nBMA 60/40 | MMA/nBMA/MAA 79.8/20/0.2 | 50/50 | 350 | 36 |
| A'8 | MMA/nBMA 60/40 | MMA/nBMA/MAA 68/20/12 | 50/50 | 410 | 42 |
| A'9 | MMA/nBMA 60/40 | MMA/nBMA/MAA 76/20/4 | 50/50 | 80 | 8 |
| A'10 | iBMA 100 | MMA/MAA 99/1 | 30/70 | 300 | 50 |
| A'11 | iBMA/EMA/MAA 59/40/1 | MMA/MAA 99/1 | 40/60 | 320 | 42 |
| A'12 | nBMA/CHMA 70/30 | MMA/BzMA 60/40 | 60/40 | 300 | 23 |
| A'13 | nMMA/iBMA/nBA 40/40/20 | MMA/MAA 98.6/1.4 | 35/65 | 280 | 59 |
| A'14 | MMA/iBMA/EMA/nBA 12/50/18/20 | MMA/EMA/AA 88/10/2 | 40/60 | 300 | 39 |
| A'15 | MMA/nBMA/IA 48/50/2 | MMA/IA 98/2 | 50/50 | 320 | 33 |
| A'16 | MMA/nBMA/MAA 47.5/50/2.5 | MMA/MAA 97.5/2.5 | 50/50 | 330 | 34 |
| A'17 | MMA/iBMA/MAA 69/30/1 | — | | 340 | 0 |

TABLE 1-continued

Monomer composition and characteristics of the produced polymer fine particles

| Polymer fine particles | Monomer composition (mol %) Core (Mc) | Shell (Ms) | Core-shell ratio | Particle diameter (nm) | Thickness of shell (nm) |
|---|---|---|---|---|---|
| A'18 | MMA/iBMA/MAA 59/40/1 | | — | 340 | 0 |
| A'19 | MMA/iBMA/MAA 49/50/1 | | — | 330 | 0 |
| A'20 | MMA/iBMA/MAA 39/60/1 | | — | 310 | 0 |
| A'21 | MMA 100 | MAA 100 | 99/1 | 2000 | 3 |
| A'22 | MMA 100 | MAA 100 | 99/1 | 2000 | 3 |
| A'23 | MMA/nBMA 70/30 | MMA 100 | 99/1 | 2000 | 3 |
| A'24 | MMa/EMA/St 50/30/20 | MMA 100 | 99/1 | 2000 | 3 |
| A'25 | MMa/nBA 80/20 | MMA 100 | 50/50 | 200 | 21 |
| A'26 | MMA/nBA 65/35 | MMA/MAA 95/5 | 50/50 | 190 | 20 |

TABLE 2

Formulation of prepared plastisol and results of evaluation

| | Formulation of plastisol (part by weight) | | | | Results of evaluation | |
|---|---|---|---|---|---|---|
| | Polymer | Plasticizer | Filler | Additive | Viscosity | Storage stability |
| Example 1 | A1 (100) | DOP (140) | CaCO₃ (100) | — | ○ 16.8 | ⊙ 12 |
| Example 2 | A2 (100) | DINP (140) | CaCO₃ (100) | — | ○ 15.4 | ⊙ 11 |
| Example 3 | A3 (100) | DINP (140) | CaCO₃ (100) | — | ○ 14.1 | ⊙ 12 |
| Example 4 | A4 (100) | DINP (140) | CaCO₃ (100) | — | ○ 18.2 | ⊙ 14 |
| Example 5 | A5 (100) | DINP (140) | CaCO₃ (100) | — | ○ 22.0 | ⊙ 17 |
| Example 6 | A6 (100) | DINP (140) | CaCO₃ (100) | — | ○ 21.2 | ○ 35 |
| Example 7 | A7 (100) | DINP (140) | CaCO₃ (100) | — | ○ 8.5 | ⊙ 10 |
| Example 8 | A8 (100) | DINP (140) | CaCO₃ (100) | — | ○ 7.7 | ⊙ 15 |
| Example 9 | A9 (100) | DINP (140) | CaCO₃ (100) | — | ○ 7.9 | ⊙ 12 |
| Example 10 | A10 (100) | DINP (140) | CaCO₃ (100) | — | ○ 16.4 | ⊙ 12 |
| Example 11 | A11 (100) | DINP (140) | CaCO₃ (100) | — | ○ 16.9 | ⊙ 18 |
| Example 12 | A12 (100) | DINP (140) | CaCO₃ (100) | — | ○ 17.2 | ⊙ 16 |
| Example 13 | A1 (100) | DINP (140) | CaCO₃ (100) | Blocked isocyanate | ○ 24.2 | ○ 36.5 |
| Comparative Example 1 | A'1 (100) | DINP (140) | CaCO₃ (100) | — | ○ 13.3 | ⊙ 11 |
| Comparative Example 2 | A'2 (100) | DINP (140) | CaCO₃ (100) | — | X 80.7 | X Gelled |
| Comparative Example 3 | A'3 (100) | DINP (140) | CaCO₃ (100) | — | ○ 15.4 | ⊙ 12 |
| Comparative Example 4 | A'4 (100) | DINP (140) | CaCO₃ (100) | — | ○ 12.1 | ⊙ 11 |
| Comparative Example 5 | A'5 (100) | DINP (140) | CaCO₃ (100) | — | Δ 32.8 | X 280 |
| Comparative Example 6 | A'6 (100) | DINP (140) | CaCO₃ (100) | — | X 90.5 | X Gelled |
| Comparative Example 7 | A'7 (100) | DINP (140) | CaCO₃ (100) | — | Δ 30.3 | Δ 52 |
| Comparative Example 8 | A'8 (100) | DINP (140) | CaCO₃ (100) | — | ○ 28.4 | ⊙ 11 |
| Comparative Example 9 | A'9 (100) | DINP (140) | CaCO₃ (100) | — | ○ 20.2 | X 80 |
| Comparative Example 10 | A'10 (100) | DOP (140) | CaCO₃ (100) | — | ○ 25.6 | Δ 53 |
| Comparative Example 11 | A'11 (100) | DOP (140) | CaCO₃ (100) | — | ○ 28.1 | ○ 28 |
| Comparative Example 12 | A'12 (100) | DOP (140) | CaCO₃ (100) | — | X 88.5 | X Gelled |
| Comparative Example 13 | A'13 (100) | DOP (140) | CaCO₃ (100) | — | ○ 25.2 | ○ 33 |
| Comparative Example 14 | A'14 (100) | DOP (140) | CaCO₃ (100) | — | ○ 24.4 | ○ 31 |
| Comparative Example 15 | A'15 (100) | DOPh (140) | CaCO₃ (100) | — | ○ 24.0 | X 280 |
| Comparative Example 16 | A'16 (100) | DOPh (140) | CaCO₃ (100) | — | ○ 23.3 | X 300 |
| Comparative Example 17 | A'17 (100) | OBP (140) | CaCO₃ (100) | — | ○ 20.1 | X 290 |
| Comparative Example 18 | A'18 (100) | DOP (140) | CaCO₃ (100) | — | ○ 29.4 | X Gelled |
| Comparative Example 19 | A'19 (100) | DINP (140) | CaCO₃ (100) | — | Δ 43.2 | X 330 |
| Comparative Example 20 | A'20 (100) | DINP (140) | CaCO₃ (100) | — | X 67.8 | X Gelled |
| Comparative Example 21 | A'21 (100) | DEP (140) | CaCO₃ (100) | — | ○ 22.0 | Δ 68 |
| Comparative Example 22 | A'22 (100) | DBP (140) | CaCO₃ (100) | — | ○ 20.6 | Δ 57 |
| Comparative Example 23 | A'23 (100) | DOP (140) | CaCO₃ (100) | — | ○ 24.4 | Δ 83 |
| Comparative Example 24 | A'24 (100) | DBP (140) | CaCO₃ (100) | — | ○ 23.3 | Δ 77 |
| Comparative Example 25 | A'25 (100) | DOP (140) | CaCO₃ (100) | — | ○ 21.5 | ⊙ 11 |

TABLE 2-continued

Formulation of prepared plastisol and results of evaluation

| | | | | | | |
|---|---|---|---|---|---|---|
| Comparative Example 26 | A'26 (100) | DOP (140) | CaCO₃ (100) | — | ○ 21.8 | ○ 24 |

| | Results of evaluation | | |
|---|---|---|---|
| | Strength | Elongation | Plasticizer retainability |
| Example 1 | ◎ 1.3 | ◎ 320 | ○ |
| Example 2 | ◎ 1.2 | ◎ 310 | ○ |
| Example 3 | ◎ 1.5 | ◎ 330 | ○ |
| Example 4 | ◎ 1.5 | ◎ 420 | ○ |
| Example 5 | ◎ 1.4 | ◎ 390 | ○ |
| Example 6 | ◎ 1.1 | ◎ 520 | ○ |
| Example 7 | ◎ 1.5 | ◎ 340 | ○ |
| Example 8 | ◎ 1.3 | ◎ 540 | ○ |
| Example 9 | ◎ 1.3 | ◎ 500 | ○ |
| Example 10 | ◎ 1.1 | ◎ 360 | ○ |
| Example 11 | ◎ 1.5 | ◎ 370 | ○ |
| Example 12 | ◎ 1.5 | ◎ 380 | ○ |
| Example 13 | ◎ 3.1 | ◎ 310 | ○ |
| Comparative Example 1 | ◎ 2.2 | X 20 | X |
| Comparative Example 2 | — | — | — |
| Comparative Example 3 | ◎ 2.1 | X 30 | X |
| Comparative Example 4 | ◎ 2.1 | X 40 | X |
| Comparative Example 5 | Δ 0.6 | ○ 280 | ○ |
| Comparative Example 6 | — | — | — |
| Comparative Example 7 | ◎ 1.4 | ○ 280 | ○ |
| Comparative Example 8 | X 0.3 | X 20 | X |
| Comparative Example 9 | ◎ 1.4 | ○ 230 | ○ |
| Comparative Example 10 | ○ 0.9 | X 75 | X |
| Comparative Example 11 | ○ 0.9 | X 55 | X |
| Comparative Example 12 | — | — | — |
| Comparative Example 13 | ◎ 1.5 | X 59 | X |
| Comparative Example 14 | ◎ 1.4 | X 57 | X |
| Comparative Example 15 | Δ 0.7 | ○ 280 | ○ |
| Comparative Example 16 | ○ 0.8 | ○ 270 | ○ |
| Comparative Example 17 | ○ 0.8 | Δ 270 | ○ |
| Comparative Example 18 | ○ 0.9 | ○ 290 | ○ |
| Comparative Example 19 | X 0.3 | ◎ 320 | ○ |
| Comparative Example 20 | X 0.3 | ◎ 460 | ○ |
| Comparative Example 21 | ○ 0.8 | Δ 220 | ○ |
| Comparative Example 22 | Δ 0.7 | Δ 230 | ○ |
| Comparative Example 23 | ○ 0.9 | Δ 260 | ○ |
| Comparative Example 24 | X 1.3 | Δ 240 | ○ |
| Comparative Example 25 | ◎ 2.1 | X 50 | X |
| Comparative Example 26 | ○ 0.9 | Δ 190 | X |

What is claimed is:

1. Acrylic polymer fine particles which consist essentially of primary particles P having a core-shell structure consisting essentially of a core polymer C and a shell polymer S, wherein the average particle diameter of the primary particles P is not less than 250 nm, the core polymer C and the shell polymer S being copolymers of the following monomer mixtures Mc and Ms, respectively, and wherein the weight ratio of Mc and Ms is 10/90–90/10;

Mc:
methyl methacrylate 20–85 mol %
(meth)acrylic ester of $C_2$–$C_8$ aliphatic alcohol or aromatic alcohol or both 15–80 mol %, and
and other copolymerizable monomers not more than 30 mol %,
where the total amount of these monomers is 100 mol %;

Ms:
methyl methacrylate 20–79.5 mol %,
(meth)acrylic ester of $C_2$–$C_8$ aliphatic alcohol or aromatic alcohol or both 5–40 mol %,
monomer containing carboxyl group or sulfonic acid group
and other copolymerizable monomers
not more than 30 mol %, where the total amount of these monomers is 100 mol%.

2. The acrylic polymer fine particles according to claim 1, wherein the core polymer C and the shell polymer S are copolymers of the following monomer mixtures Mc and Ms, respectively, and the weight ratio of Mc and Ms is 30/70–70/30;

Mc:
methyl methacrylate 20–70 mol %
at least one (meth)acrylic ester selected from the group consisting of n-butyl (meth)acrylate, i-butyl (meth)acrylate and t-butyl (meth)acrylate 30–80 mol %, and
other copolymerizable monomers not more than 20 mol %,
when the total amount of these monomers is 100 mol %;

Ms:
methyl methacrylate 30–79.5 mol %
at least one (meth)acrylic ester selected from the group consisting of n-butyl (meth)acrylate, i-butyl (meth)acrylate and t-butyl (meth)acrylate 5–40 mol %
acrylic monomer containing carboxyl group 0.5–10 mol %, and
other copolymerizable monomers not more than 20 mol %,
when the total amount of these monomers is 100 mol %.

3. The acrylic polymer fine particles according to claim 1, wherein the core polymer C and the shell polymer S are copolymers of the following monomer mixtures Mc and Ms, respectively, and the weight ratio of Mc and Ms is 30/70–70/30;

Mc:
- methyl methacrylate 20–70 mol %
- at least one (meth)acrylic ester selected from the group consisting of n-butyl (meth)acrylate, i-butyl (meth)acrylate and t-butyl (meth)acrylate 30–80 mol %, and
- other copolymerizable monomers not more than 10 mol %,
- when the total amount of these monomers is 100 mol %;

Ms:
- methyl methacrylate 55–79.5 mol %,
- at least one (meth)acrylic ester selected from the group consisting of n-butyl (meth)acrylate, i-butyl (meth)acrylate and t-butyl (meth)acrylate 20–40 mol %
- acrylic monomer containing carboxyl group 0.5–5 mol %, and
- other copolymerizable monomers not more than 10 mol %,
- when the total amount of these monomers is 100 mol %.

4. A plastisol comprising the acrylic polymer fine particles according to claim 1, and a plasticizer.

5. The plastisol according to claim 4, wherein the main component of the plasticizer is a dialkyl phthalate compound.

6. The acrylic polymer fine particles according to claim 1, having a core/shell thickness ratio in a range of from 35/65 to 65/35.

7. The acrylic polymer fine particles according to claim 1, having a particle diameter of from 340 to 1,410 nm.

8. The acrylic polymer fine particles according to claim 1, having a shell thickness in a range of from 36 to 145 nm.

9. The plastisol according to claim 4, having an elongation of at least 310.

10. The plastisol according to claim 4, having an elongation of at least 360.

11. The plastisol according to claim 10, having an elongation of at least 420.

12. The plastisol according to claim 11, having an elongation of at least 500.

13. The plastisol according to claim 4, having a strength of at least 1.1.

14. The plastisol according to claim 13, having a strength of at least 1.5.

15. The plastisol according to claim 14, having a strength of at least 2.2.

16. The plastisol according to claim 4, having an elongation of at least 310, and a strength of at least 1.1.

17. A substrate having a surface thereof coated with the plastisol according to claim 4.

18. The substrate according to claim 17, which is metallic.

19. The substrate according to claim 17, which is non-metallic.

20. The substrate according to claim 17, which is coated with said plastisol at a thickness of from 5 $\mu$m to 5 mm.

21. The acrylic polymer fine particles according to claim 1, wherein said acrylic polymer fine particles have a secondary or higher order structure.

22. The acrylic polymer fine particles according to claim 21, wherein said secondary or higher order structure is one selected from the group consisting of primary particles cohering with a weak cohesive force, primary particles cohering with a strong cohesive force, particles fusion bonded to each other with heat and particles having higher order structure by granulation.

23. The acrylic polymer fine particles according to claim 22, wherein the secondary or higher order structure is primary particles cohering with a weak cohesive force.

24. The acrylic polymer fine particles according to claim 22, wherein the secondary or higher order structure is primary particles fusion bonded to each other with heat.

25. The acrylic polymer fine particles according to claim 22, wherein the primary particles have higher order structure by granulation.

* * * * *

UNITED STATES PATENT AND TRADEMARK OFFICE
CERTIFICATE OF CORRECTION

PATENT NO. : 6,433,048 B2
DATED : August 13, 2002
INVENTOR(S) : Toshihiro Kasai

It is certified that error appears in the above-identified patent and that said Letters Patent is hereby corrected as shown below:

Column 22,
Line 36, "group" should read -- group 0.5 to 10 mol%, and --.

Signed and Sealed this

Twenty-first Day of June, 2005

JON W. DUDAS
*Director of the United States Patent and Trademark Office*